US012672204B2

(12) United States Patent
Jeong

(10) Patent No.: US 12,672,204 B2
(45) Date of Patent: Jun. 30, 2026

(54) METHOD AND DEVICE FOR SUPPORTING VOICE HANDOVER IN WIRELESS COMMUNICATION SYSTEM

(71) Applicant: Samsung Electronics Co., Ltd., Suwon-si (KR)

(72) Inventor: Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 17/995,844

(22) PCT Filed: Apr. 7, 2021

(86) PCT No.: PCT/KR2021/004341
§ 371 (c)(1),
(2) Date: Oct. 7, 2022

(87) PCT Pub. No.: WO2021/206443
PCT Pub. Date: Oct. 14, 2021

(65) Prior Publication Data
US 2023/0156530 A1     May 18, 2023

(30) Foreign Application Priority Data
Apr. 8, 2020     (KR) ........................ 10-2020-0043018

(51) Int. Cl.
*H04W 76/30*          (2018.01)
*H04W 36/00*          (2009.01)
(Continued)

(52) U.S. Cl.
CPC ..... *H04W 76/30* (2018.02); *H04W 36/00226* (2023.05); *H04W 36/0066* (2013.01); *H04W 36/144* (2023.05); *H04W 72/56* (2023.01)

(58) Field of Classification Search
CPC ........................ H04W 76/30; H04W 36/00226
See application file for complete search history.

(56) References Cited

U.S. PATENT DOCUMENTS 9,585,065 B2     2/2017  Lin et al.
9,706,538 B1     7/2017  Oroskar et al.
(Continued)

FOREIGN PATENT DOCUMENTS

CN          101909343 A     12/2010
CN          104038964 A     9/2014
(Continued)

OTHER PUBLICATIONS

International Search Report and Written Opinion of the International Searching Authority dated Jul. 12, 2021, in connection with International Application No. PCT/KR2021/004341, 11 pages.
(Continued)

*Primary Examiner* — Douglas B Blair

(57)          ABSTRACT

The present disclosure relates to a 5G or pre-5G communication system for supporting higher data transmission rates than 4G communication systems such as LTE. The present invention relates to a method and device for supporting voice handover in a wireless communication system and increasing service quality in a mobile communication system, and more specifically, to a method for a UE connected to a first network to communicate with a network in a wireless communication system, the method comprising the steps of: connecting a voice call to a second network; receiving, from a base station of the second network, a message including control information for controlling wireless access of the UE; and using the control information to determine the radio access technology (RAT) to be used and the PLMN to be accessed after the voice call is completed, wherein the first network and the second network communicate using different RATs, and the voice call is connected to the second network by circuit switching (CS).

8 Claims, 14 Drawing Sheets

(51) Int. Cl.
    *H04W 36/14*     (2009.01)
    *H04W 72/56*     (2023.01)

(56)         References Cited

U.S. PATENT DOCUMENTS

| | | | |
|---|---|---|---|
| 2013/0090082 A1 | 4/2013 | Lim et al. | |
| 2013/0195009 A1* | 8/2013 | Ramle | H04W 40/34 |
| | | | 370/328 |
| 2013/0315203 A1* | 11/2013 | Wong | H04W 36/00226 |
| | | | 370/331 |
| 2014/0051443 A1 | 2/2014 | Diachina et al. | |
| 2014/0206353 A1 | 7/2014 | Kim et al. | |
| 2015/0148048 A1 | 5/2015 | Jamadagni et al. | |
| 2015/0296420 A1* | 10/2015 | Drevon | H04W 36/00224 |
| | | | 455/436 |
| 2015/0382267 A1 | 12/2015 | Wang et al. | |
| 2016/0157142 A1* | 6/2016 | Koskinen | H04W 36/00224 |
| | | | 370/331 |
| 2016/0174120 A1* | 6/2016 | Zembutsu | H04W 36/0064 |
| | | | 370/331 |
| 2016/0309374 A1 | 10/2016 | Shu et al. | |
| 2017/0105150 A1* | 4/2017 | Olsson | H04W 36/0058 |
| 2017/0134929 A1* | 5/2017 | Semama | H04W 36/00224 |
| 2018/0191786 A1* | 7/2018 | Kunz | H04W 8/12 |
| 2019/0159074 A1* | 5/2019 | Velev | H04W 36/305 |
| 2019/0223069 A1* | 7/2019 | Wong | H04W 8/18 |
| 2019/0289493 A1 | 9/2019 | Jeong et al. | |
| 2019/0394683 A1* | 12/2019 | Sillanpaa | H04W 60/04 |
| 2020/0305033 A1* | 9/2020 | Keller | H04W 36/00226 |
| 2020/0322850 A1* | 10/2020 | Zhu | H04W 36/0085 |
| 2020/0383010 A1* | 12/2020 | Zhu | H04W 36/00226 |
| 2021/0022049 A1* | 1/2021 | Ke | H04W 36/0066 |
| 2021/0029611 A1* | 1/2021 | Chong | H04W 36/1443 |
| 2021/0076264 A1* | 3/2021 | Zhang | H04W 36/0085 |
| 2021/0120461 A1* | 4/2021 | Chong | H04W 36/0033 |
| 2021/0153290 A1* | 5/2021 | Ahmad | H04W 76/16 |
| 2021/0185567 A1* | 6/2021 | Zhang | H04W 36/00226 |
| 2021/0195470 A1* | 6/2021 | Lei | H04W 76/10 |
| 2021/0211944 A1* | 7/2021 | Eklöf et al. | H04W 76/30 |
| 2021/0321316 A1* | 10/2021 | Shen | H04W 48/18 |

FOREIGN PATENT DOCUMENTS

| | | | | | |
|---|---|---|---|---|---|
| CN | 104137608 | A | 11/2014 | | |
| CN | 104904265 | A | 9/2015 | | |
| CN | 110366214 | A | 10/2019 | | |
| CN | 110710247 | A | 1/2020 | | |
| EP | 2945425 | A1 | 11/2015 | | |
| KR | 10-1752073 | B1 | 6/2017 | | |
| WO | 2017140342 | A1 | 8/2017 | | |
| WO | 2019117769 | A1 | 6/2019 | | |
| WO | 2019226111 | A1 | 11/2019 | | |
| WO | 2019227278 | A1 | 12/2019 | | |
| WO | WO-2020052613 | A1 * | 3/2020 | ............ | H04W 12/04 |

OTHER PUBLICATIONS

China Unicom, et al., "Introduction of SRVCC from 5G to 3G," R2-2000651, 3GPP TSG-RAN2 Meeting #109-e, Electronic meeting, Feb. 24-Mar. 6, 2020, 8 pages.

Ericsson, et al., "Introduction of SRVCC from 5G to 3G," R2-2000335, Revision of R2-1914646, 3GPP TSG-RAN WG2 Meeting #109-e, Electronic meeting, Feb. 24-28, 2020, 11 pages.

Supplementary European Search Report dated Jun. 2, 2023, in connection with European Application No. 21784122.0, 10 pages.

The First Office Action dated Jun. 28, 2024, in connection with Chinese Application No. 202180027456.5, 18 pages.

The Second Office Action issued Nov. 29, 2024, in connection with Chinese Patent Application No. 202180027456.5, 20 pages.

Communication pursuant to Article 94(3) EPC dated Mar. 20, 2025, in connection with European Patent Application No. 21784122.0, 8 pages.

SA2, "[Draft] LS on Transfer of SPID during (inter-RAT) handover," TD S2-111206, 3GPP TSG SA WG2 Meeting #83, Salt Lake City, Utah, USA, Feb. 21-25, 2011, 2 pages.

Rejection Decision issued Feb. 27, 2025, in connection with Chinese Patent Application No. 202180027456.5, 22 pages.

Office Action dated Sep. 3, 2025, in connection with Korean Application No. 10-2020-0043018, 16 pages.

\* cited by examiner

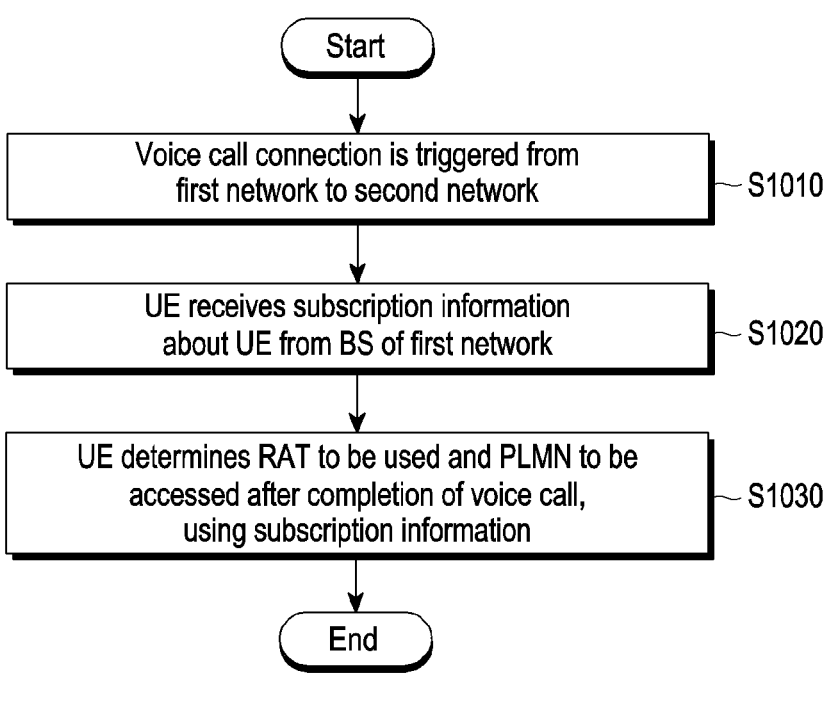

```
        ┌─────────┐
        │  Start  │
        └────┬────┘
             │
             ▼
┌───────────────────────────────────┐
│  Voice call connection is triggered from │  ── S1010
│  first network to second network   │
└─────────────────┬─────────────────┘
                  │
                  ▼
┌───────────────────────────────────┐
│  UE receives subscription information │  ── S1020
│  about UE from BS of first network  │
└─────────────────┬─────────────────┘
                  │
                  ▼
┌───────────────────────────────────┐
│  UE determines RAT to be used and PLMN to be │  ── S1030
│  accessed after completion of voice call,    │
│  using subscription information     │
└─────────────────┬─────────────────┘
                  │
                  ▼
             ┌─────────┐
             │   End   │
             └─────────┘
```

FIG. 10

```
        ┌─────────┐
        │  Start  │
        └────┬────┘
             │
             ▼
┌───────────────────────────────────┐
│  Voice call connection is triggered │  ── S1110
│  from first network to second network │
└─────────────────┬─────────────────┘
                  │
                  ▼
┌───────────────────────────────────┐
│  BS of first network receives subscription │  ── S1120
│  information about UE from entity of first network │
└─────────────────┬─────────────────┘
                  │
                  ▼
┌───────────────────────────────────┐
│  BS of first network transmits      │  ── S1130
│  subscription information to UE     │
└─────────────────┬─────────────────┘
                  │
                  ▼
             ┌─────────┐
             │   End   │
             └─────────┘
```

METHOD AND DEVICE FOR SUPPORTING VOICE HANDOVER IN WIRELESS COMMUNICATION SYSTEM

CROSS-REFERENCE TO RELATED APPLICATIONS

This application is a 371 of International Application No. PCT/KR2021/004341, filed Apr. 7, 2021, which claims priority to Korean Patent Application No. 10-2020-0043018, filed Apr. 8, 2020, the disclosures of which are herein incorporated by reference in their entirety.

BACKGROUND

1. Field

The disclosure relates to a method of increasing service quality in a mobile communication system, and more particularly, to a method of providing control information to a user equipment (UE) during handover of a voice call.

2. Description of Related Art

Efforts are being made to develop an advanced 5th generation (5G) communication system or a pre-5G communication system in order to meet the increasing demands for wireless data traffic after the commercialization of 4th generation (4G) communication systems. For this reason, the 5G communication system or the pre-5G communication system is called a beyond 4G network communication system or a post long term evolution (LTE) system. To achieve a high data rate, implementation of a 5G communication system in a very high frequency (mmWave) band (e.g., a 60 GHz band) is considered. To reduce the path loss of radio waves and increase the propagation distance of the radio waves in the very high frequency band, beamforming, massive multiple input multiple output (MIMO), full dimensional MIMO (FD-MIMO), array antenna, analog beamforming, and large scale antenna are being discussed for the 5G communication system. In addition, for network improvement of the system, technologies such as evolved small cell, advanced small cell, cloud radio access network (cloud RAN), an ultra dense network, device-to-device communication (D2D), wireless backhaul, moving network, cooperative communication, coordinated multi-points (CoMP), and interference cancellation are under development in the 5G communication system. Besides, advanced coding modulation (ACM) techniques such as hybrid FSK and QAM modulation (FQAM) and sliding window superposition coding (SWSC), and advanced access techniques such as filter bank multi carrier (FBMC), non-orthogonal multiple access (NOMA), and sparse code multiple access (SCMA) are being developed in the 5G system.

The Internet is evolving from a human-centered connection network in which humans create and consume information to an Internet of things (IoT) in which information is exchanged and processed between distributed components such as objects. Internet of Everything (IoE) is also emerging, which combines big data processing technology with IoT technology through connections to cloud servers and so on. To implement IoT, technology elements such as sensing technology, wired and wireless communication and network infrastructure, service interface technology, and security technology are required. Therefore, techniques including a sensor network for connection between objects, machine to machine (M2M), and machine type communication (MTC)

have been studied over the recent years. In the IoT environment, intelligent Internet technology (IT) services may be provided to create new values in human life by collecting and analyzing data generated from connected objects. IoT may find its applications in the fields of smart home, smart buildings, smart cities, smart cars or connected cars, smart grids, healthcare, smart home appliances, advanced medical service, and so on through convergence and merging between the existing IT and various industries.

Accordingly, various attempts have been made to apply a 5G communication system to an IoT network. For example, technologies such as sensor network, M2M, and MTC are implemented by 5G communication technologies such as beamforming, MIMO, and array antenna. It may be said that the application of a cloud RAN as the afore-described big data processing technology is an example of the convergence between the 5G technology and the IoT technology.

SUMMARY

Single radio voice call continuity (SRVCC) is a system that allows for handover of a voice call from packet data to circuit switched data as well as inter radio access technology (inter-RAT) handover. When a user equipment (UE) leaves a 5th generation (5G) service area, handover to a legacy network (e.g., 3G RAT) is required. Therefore, there is a need for a method of controlling a RAT to be used by the UE or a public land mobile network (PLMN) to be accessed by the UE, upon completion of a voice call after 5G to 3G SRVCC of the voice call by originating or terminating the voice call in a 3G network. Because there are no parameters related to the 5G network in the 3G network, and SRVCC is applicable only to connected mode mobility, a RAT/frequency selection priority (RFSP) index or a service profiling identity (SPID), which is delivered to the UE only in idle mode mobility, may not be transmitted to the UE.

Therefore, there is a need for a method of controlling a RAT to be used by a UE or a PLMN to be accessed by the UE, upon completion of a voice call after 5G to 3G SRVCC of the voice call through origination or termination of the voice call in a 3G network.

According to an embodiment of the disclosure, a method of communicating with a network by a user equipment (UE) connected to a first network in a wireless communication system may include: connecting a voice call to a second network; receiving, from a base station (BS) of the second network, a message including control information for controlling radio access of the UE; and determining a radio access technology (RAT) to be used and a public land mobile network (PLMN) to be accessed after completion of the voice call, using the control information. The first network and the second network may communicate using different RATs, and the voice call may be connected to the second network in a circuit switched (CS) manner.

The method may further include communicating with a network of the determined PLMN, using the determined RAT.

The connection may be single radio voice call continuity (SRVCC) handover, the control information may include at least one of a subscriber profile id (SPID) or a PLMN ID, and the message may be a radio resource control (RRC) release message.

The message may be received after completion of the voice call of the UE.

The first network may be a 5th generation (5G) network, and the second network may be a 3rd generation (3G) network.

The control information may include priority information about RATs and PLMNs.

The UE may communicate with the first network, using a first RAT before the connection, and the priority information may prioritize a PLMN of the first network and the first RAT as a first priority.

According to an embodiment of the disclosure, a UE connected to a first network, for communicating with a network in a wireless communication system may include: a transceiver receiving a message including control information for controlling radio access of the UE from a base station (BS) of a second network; and a controller connecting a voice call to the second network and determining a RAT to be used and a PLMN to be accessed after completion of the voice call, using the control information. The first network and the second network may communicate using different RATs, and the voice call may be connected to the second network in a CS manner.

According to an embodiment of the disclosure, a method of communicating with a network by a BS of a second network in a wireless communication system may include: connecting a voice call from a first network to the second network; receiving control information for a UE from an entity of the second network; and transmitting a message including the control information to the UE. The first network and the second network may communicate using different RATs, and the UE and the second network connect the voice call in a CS manner.

According to an embodiment of the disclosure, a BS of a second network, for communicating with a network in a wireless communication system may include: a transceiver receiving control information for a UE from an entity of the second network; and a controller controlling the transceiver to transmit a message including the control information to the UE. The control information may be received after a voice call is connected from a first network to the second network, the first network and the second network may communicate using different RATs, and the UE and second network may connect the voice call in a CS manner.

According to an embodiment of the disclosure, a method of communicating with a network by a UE connected to a first network in a wireless communication system may include: receiving control information for the UE from an entity of the first network; connecting a voice call to a second network; and determining a RAT to be used and a PLMN to be accessed after completion of the voice call, using the control information. The first network and the second network may communicate using different RATs, and the voice call may be connected to the second network in a CS manner.

The method may further include communicating with a network of the determined PLMN, using the determined RAT.

The control information may be included in a non-access stratum (NAS) message received from the entity.

The control information may be transmitted from the entity to a BS and then included in a message received from the BS.

The control information may be received from the entity periodically or when a specific condition is satisfied.

According to an embodiment of the disclosure, a UE connected to a first network, for communicating with a network in a wireless communication system may include: a transceiver receiving control information for the UE from an entity of the first network; and a controller connecting a voice call to a second network, and determining a RAT to be used and a PLMN to be accessed after completion of the voice call, using the control information. The first network and the second network may communicate using different RATs, and the voice call may be connected to the second network in a CS manner.

According to an embodiment of the disclosure, a method of communicating with a network by a first entity of a first network in a wireless communication system may include: receiving control information for a UE from a second entity of the first network; transmitting the control information to the UE; and connecting a voice call from the first network to a second network. The first network and the second network may communicate using different RATs, and the voice call may be connected to the second network in a CS manner.

The control information may be included and received in a first message from the second entity of the first network, and the first message may be received from the second entity of the first network periodically or when a specific condition is satisfied.

According to an embodiment of the disclosure, a first entity of a first network, for communicating with a network in a wireless communication system may include: a transceiver receiving control information for a UE from a second entity of the first network; and a controller controlling the transceiver to transmit the control information to the UE, and connecting a voice call from the first network to a second network. The first network and the second network may communicate using different RATs, and the voice call may be connected to the second network in a CS manner.

According to an embodiment of the disclosure, a method of communicating with a network by a UE connected to a first network in a wireless communication system may include having a voice call connection triggered to a second network, receiving control information for the UE from a BS of the first network; and determining a RAT to be used and a PLMN to be accessed after completion of the voice call, using the control information. The first network and the second network may communicate using different RATs, and the voice call may be connected to the second network in a CS manner.

The control information may be included in a handover message received from the BS.

According to an embodiment of the disclosure, a UE connected to a first network in a wireless communication system may include: a transceiver receiving control information for the UE from a BS of the first network; and a controller determining a RAT to be used and a PLMN to be accessed after completion of a voice call, using the control information. The control information may be received after a voice call connection is triggered from the first network to a second network, the first network and the second network may communicate using different RATs, and the voice call may be connected to the second network in a CS manner.

According to an embodiment of the disclosure, a method of communicating with a network by a BS of a first network in a wireless communication system may include having a voice call connection triggered from the first network to a second network; receiving control information for a UE from an entity of the first network; and transmitting the control information to the UE. The first network and the second network may communicate using different RATs, and the voice call may be connected to the second network in a CS manner.

The control information may be included and received in a first handover message from the entity The control information may be included and transmitted in a second handover message to the UE.

According to an embodiment of the disclosure, a BS of a first network, for communicating with a network in a wireless communication system may include: a transceiver receiving control information for a UE from an entity of the first network; and a controller transmitting the control information to the UE. The control information may be received after a voice call connection is triggered from the first network to a second network, the first network and the second network may communicate using different RATs, and the voice call is connected to the second network in a CS manner.

According to an embodiment of the disclosure, a method of communicating with a network by a first entity of a first network in a wireless communication system may include: receiving control information for a UE from a second entity of the first network; having a voice call connection triggered from the first network to a second network; and transmitting the control information to a BS of the first network. The first network and the second network may communicate using different RATs, and the voice call may be connected to the second network in a CS manner.

The control information may be received during registration of the UE in the first network.

The control information may be included in a handover message transmitted to the BS.

According to an embodiment of the disclosure, a first entity of a first network, for communicating with a network in a wireless communication system may include: a transceiver receiving control information for a UE from a second entity of the first network; and a controller controlling the transceiver to transmit the control information to a BS of the first network. The control information may be received before a voice call connection is triggered from the first network to a second network. The first network and the second network may communicate using different RATs, and the voice call may be connected to the second network in a CS manner.

Advantageous Effects

The disclosure advantageously increases voice service quality in a wireless communication system through various embodiments of the disclosure.

According to the disclosure, a radio access technology (RAT) to be used by a user equipment (UE) or a public land mobile network (PLMN) to be accessed by the UE, upon completion of a voice call after 5G to 3G single radio voice call continuity (SRVCC) of the voice call through origination or termination of the voice call in a 3G network may be controlled.

According to the disclosure, a RAT/frequency selection priority (RFSP) index or a service profiling identity (SPID) may be received from a network even in connection mode mobility of a UE other than idle mode mobility.

According to the disclosure, a RAT to be used by a UE or a public land mobile network (PLMN) to be accessed by the UE upon completion of a voice call after 5G to 3G SRVCC of the voice call through origination or termination of the voice call in a 3G network may be provided without any modification to existing 3rd generation (3G) network parameters and standards of 3G network equipment.

BRIEF DESCRIPTION OF THE DRAWINGS

FIG. 10 is a flowchart illustrating a method of communicating with a network by a UE connected to a first network in a wireless communication system according to another embodiment of the disclosure.

FIG. 11 is a flowchart illustrating a method of communicating with a network by a BS of a first network in a wireless communication system according to another embodiment of the disclosure.

DETAILED DESCRIPTION

The operation principle of the disclosure will be described below in detail with reference to the accompanying drawings. A detailed description of a generally known function or structure will be avoided lest it should obscure the subject matter of the disclosure. Although terms as described later are defined in consideration of functions in the disclosure, the terms may be changed according to the intention of a user or an operator, or customs. Therefore, the definitions should be made, not simply by the actual terms used but by the meanings of each term lying within.

In the following description, a term identifying an access node, terms indicating network entities or network functions (NFs), terms indicating messages, a term indicating an interface between network objects, terms indicating various types of identification information, and so on are provided by way of example, for convenience of description. Accordingly, the disclosure is not limited to the terms described below, and other terms indicating objects having equivalent technical meanings may be used.

For convenience of description, terms and names defined in the 3rd generation partnership project long term evolution (3GPP LTE) standards and the 5G standards are used in the disclosure. However, the disclosure is not limited by the terms and names, and may be equally applied to systems conforming to other standards.

While the description of embodiments of the disclosure focuses on a method of increasing the quality of a voice service in an environment in which a 5th generation (5G) system and a legacy system co-exist, the main subject matter of the disclosure is applicable to any type of wireless communication system, and applicable to other types of services (video call, gaming, chatting, etc.) as well voice service.

To support various 5G services, a new system structure and new protocols are required, and the 3GPP has determined to introduce a new technology called service-based architecture (SBA). The key feature of the SBA lies in that the functionalities of NFs defined by the 3GPP standards are divided on a service basis in consideration of virtualization technology, introduction of a cloud environment, and web-based service extension, and hypertext transfer protocol version 2 (HTTP/2) is used to implement these services.

Figure 1:
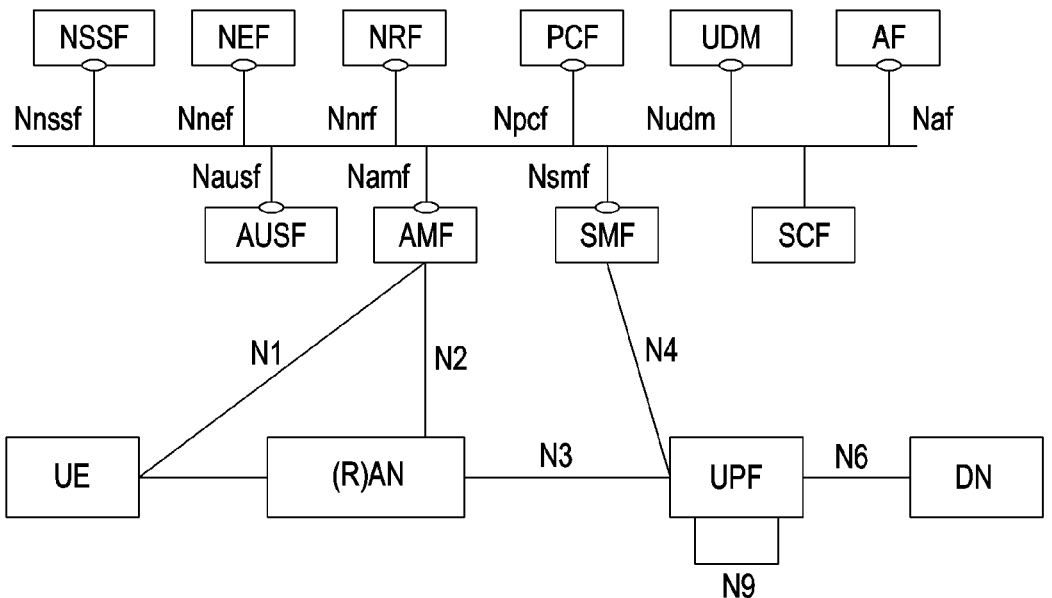
FIG. 1 is a diagram illustrating a 5th generation (5G) system structure based on a service-based architecture (SBA) according to an embodiment of the disclosure.

FIG. 1 is a diagram illustrating the structure of an SBA-based 5G system according to an embodiment of the disclosure.

Referring to FIG. 1, an access and mobility management function (AMF) is an NF that manages wireless network access and mobility for a user equipment (UE). A session management function (SMF) is an NF that manages a session for the UE, and session information includes quality of service (QoS) information, charging information, and packet processing information. A user plane function (UPF) is an NF that handles user plane traffic, and may be controlled by the SMF. While not shown in FIG. 1, the 5G system may include an unstructured data storage network function (UDSF). The UDSF is an NF that stores unstructured data, and any type of data may be stored or retrieved according to a request of an NF (e.g., the AMF, the SMF, or the like) other than the UDSF.

Figure 2:
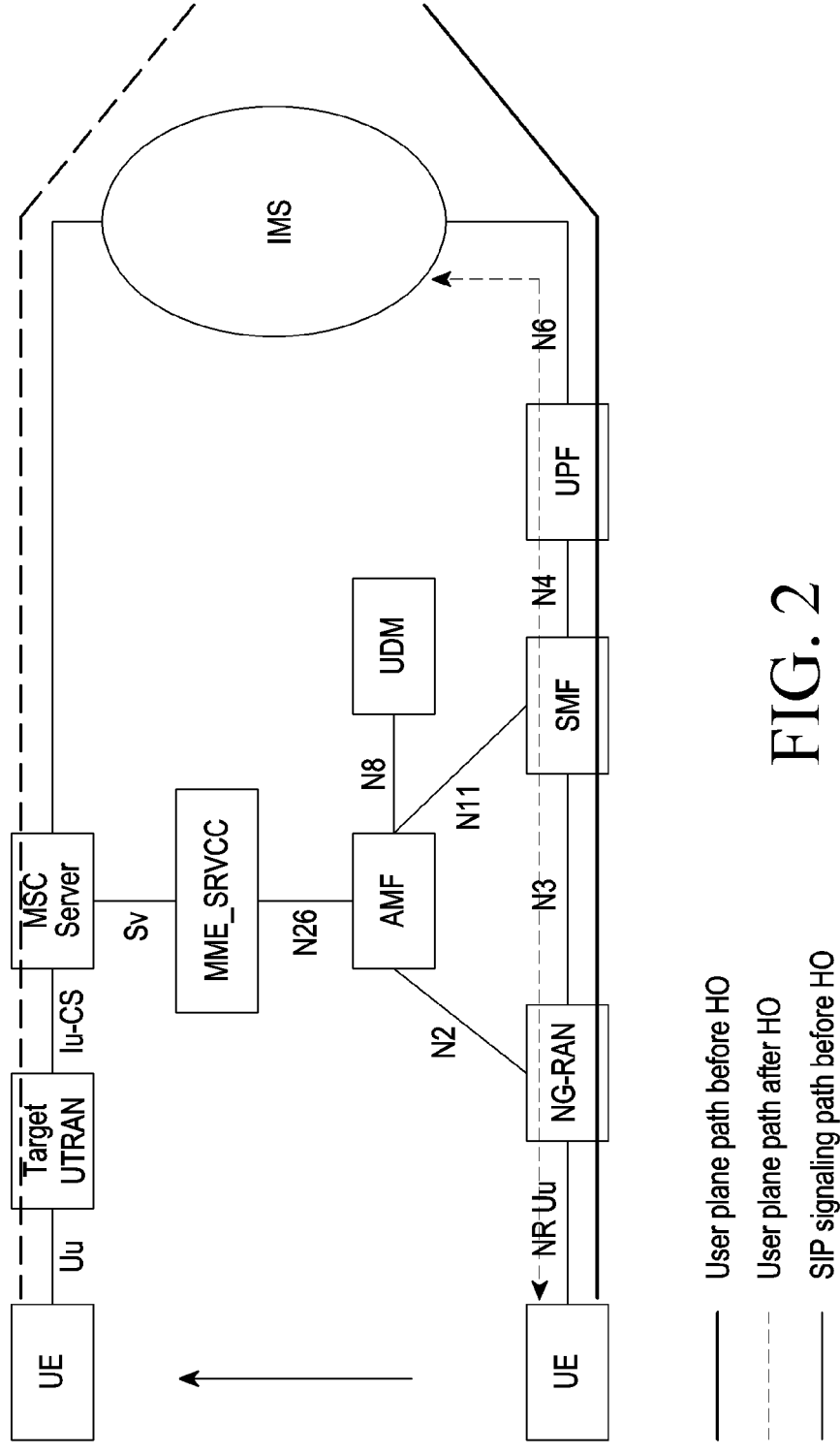
FIG. 2 is a diagram illustrating the structure of a voice service support network according to an embodiment of the disclosure.

FIG. 2 is a diagram illustrating the structure of a voice service support network according to an embodiment of the disclosure.

A UE may originate or terminate a voice call while operating by accessing 5G (and a next generation-RAN (NG-RAN)). When the UE moves out of a 5G service area, there is a better 3G network, or other conditions for handover to 3G are satisfied, during the voice call in progress, the UE may be handed over to the 3G network by the network. To support information transfer and call processing for the UE between the 5G network (an AMF) and the 3G network (a mobile switching center (MSC) server), a 4th generation (4G) network (an MME_SRVCC) may be implemented to support single radio voice call continuity (SRVCC) between the 5G network and the 3G network, so that the MME_SRVCC of the 4G network may be connected between the AMF of the 5G network and the MSC server of the 3G network.

Upon completion of the voice call conducted through handover to 3G, the UE may simply stay in the 3G network or move to another network (e.g., the UE selects the 5G network). If a communication service provider intends to move the UE to the 5G network with priority, a function to support this operation is required. In addition, when the 5G network and the 3G network use different public land mobile network (PLMN) IDs, or when the UE is to be transitioned to a specific PLMN after completion of the voice, a function for notifying the UE of the transition is required. In other words, when the PLMN ID of the 3G network in which the handover is in progress and the PLMN ID of the 5G network to which the UE is to move after the handover are different, a function for notifying the UE of the PLMN ID of the 5G network to which the UE is to move is required. Alternatively, when the UE is to move to a specific PLMN after completion of the handover voice call, a function for notifying the UE of the ID of the specific PLMN to which the UE is to move after completion of the handover voice call is required.

Figure 3:
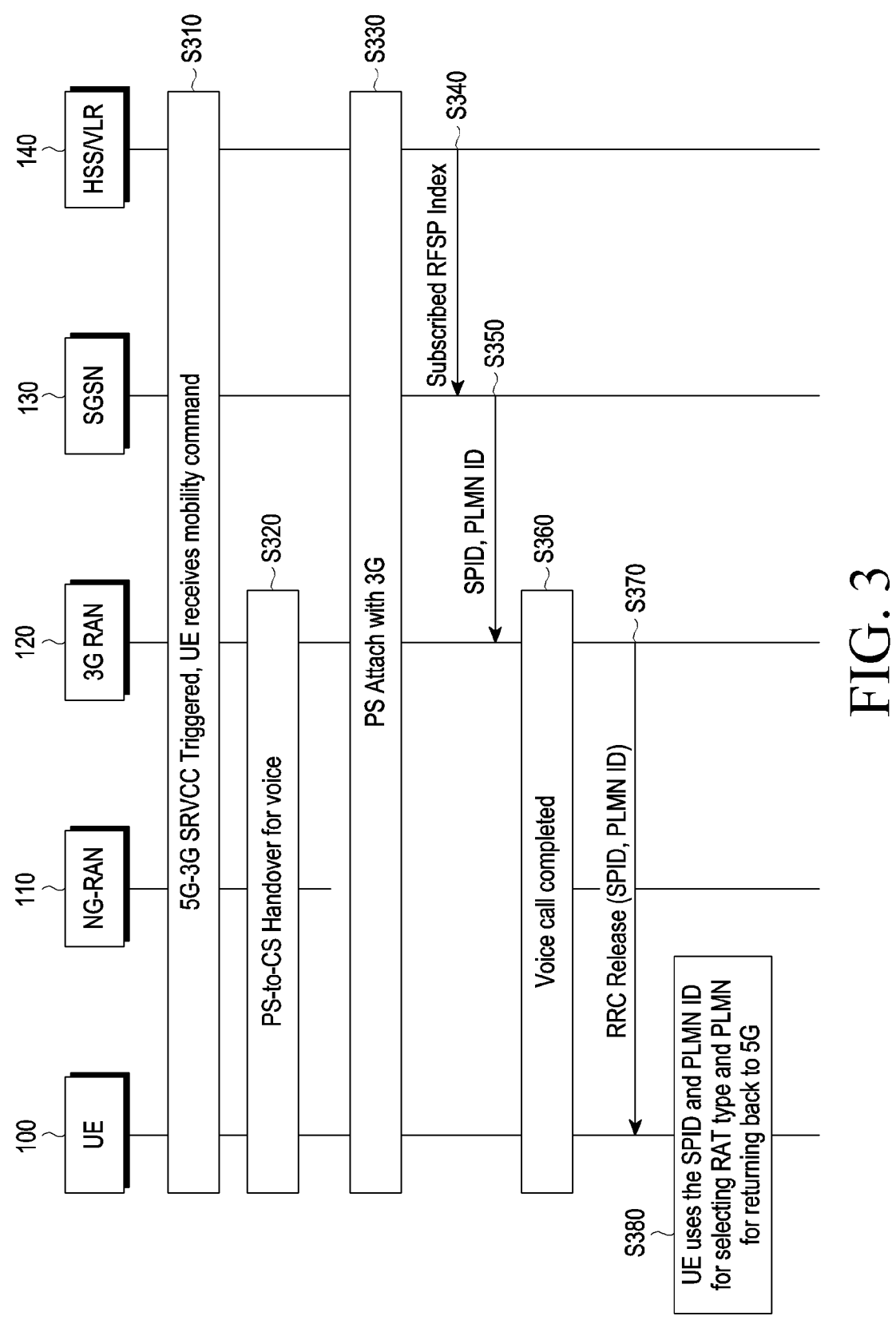
FIG. 3 is a flowchart illustrating a method of transmitting, to a user equipment (UE), a radio access technology (RAT) and a public land mobile network (PLMN) to be used by the UE, after completion of a single radio voice call continuity (SRVCC)-based voice call of the UE according to an embodiment of the disclosure.

FIG. 3 is a flowchart illustrating a method of transmitting, to a UE, information about a radio access technology (RAT) and a PLMN to be used by the UE after completion of an SRVCC-based voice call of the UE according to an embodiment of the disclosure.

A UE 100, which has registered in a 5G network, may exchange information indicating support of 5G-3G SRVCC (hereinafter, referred to as SRVCC) with the 5G network in the registration step or an additional information exchange procedure. A voice call may start (be originated or terminated) for the UE (subscriber), and an SRVCC procedure is performed by triggering SRVCC for the UE 100 according to the state and location of the UE 100, and a network configuration (S310). The SRVCC procedure is basically a process of transferring UE information including a voice call from the 5G network to the 3G network, and particularly, performing handover of the voice call from a 5G packet switched (PS) network (based on an IP multimedia subsystem (IMS)) to a circuit switched (CS) network. The UE 100 receives a message indicating handover to the 3G network from an NG-RAN.

The UE 100 performs handover from the 5G network to the 3G network. In this process, the voice call transmitted and received through the PS network is transitioned to the CS network (S320).

When needed, the UE 100 performs an operation for accessing a 3G PS network (S330). This process may start with the UE 100 transmitting a registration request (Routing Area Update or Attach Request) message to a mobility management equipment (referred to as a serving GPRS support node (SGSN)) 130 of the 3G PS network through a 3G base station (BS) 120.

During a registration procedure to the 3G PS network, a home subscriber server (HSS)/visitor location register (VLR) 140 may transmit control information to the SGSN 130 (S340), and this information may include information indicating the priorities of radio access frequencies or RATs (e.g., 5G/4G/3G) to be selected by the UE 100 after completion of the voice call. The control information may also include a PLMN ID that the UE 100 is to preferentially select, upon completion of the voice call after an SRVCC operation of the UE.

The SGSN 130 may include information indicating the priorities of radio access frequencies or RATs (e.g., 5G/4G/3G) to be selected by the UE 100 in an idle state or after completion of a voice call during an access procedure or a context configuration procedure for data transmission (S350). This information may be in the form of indexes indicating preset priorities of specific frequencies or RATs. This information may be subscriber profile IDs for RAT/frequency priorities. In addition, a PLMN ID to be preferentially selected by the UE 100 upon completion of the voice call after the SRVCC operation may be included in the information.

The voice call is completed (S360).

The UE 100 determines a frequency, a RAT, and a PLMN ID to be preferentially accessed (S380) by using the information received in step S350 (S370). When the corresponding information is configured to prioritize the 5G network as a high access priority, the UE 100 operates to preferentially access the 5G network.

Figure 4:
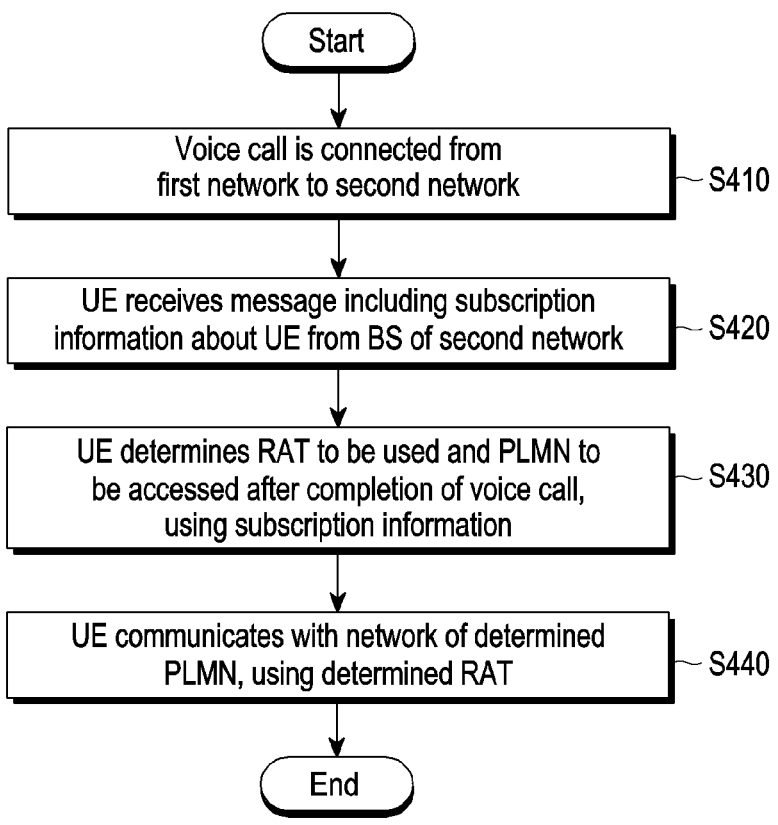
FIG. 4 is a flowchart illustrating a method of communicating with a network by a UE connected to a first network in a wireless communication system according to an embodiment of the disclosure.

FIG. 4 is a flowchart illustrating a method of communicating with a network by the UE 100 connected to a first network in a wireless communication system according to an embodiment of the disclosure.

Referring to FIG. 4, in the method of communicating with the network by the UE 100 connected to the first network in the wireless communication system, a voice call may be connected to a second network (S410). The voice call connection may be an SRVCC handover. The first network may be a 5G network, and the second network may be a 3G network. The first network and the second network may communicate using different RATs, and the voice call may be connected to the second network in a CS manner.

The UE 100 may receive, from a BS of the second network, a message including control information for controlling radio access of the UE 100 (S420). The control information may include at least one of a subscriber profiling identity (SPID) or a PLMN ID, and the message may be a radio resource control (RRC) release message. The message may be received after completion of the voice call of the UE.

The UE 100 may determine a RAT to be used and a PLMN to be accessed after the completion of the voice call, using the control information (S430). The control information may include priority information about RATs and PLMNs. Prior to the voice call connection, the UE 100 communicates with the first network, using a first RAT, and the priority information may prioritize the PLMN of the first network and the first RAT as a first priority.

The UE 100 may communicate with a network of the determined PLMN, using the determined RAT (S440).

Figure 5:
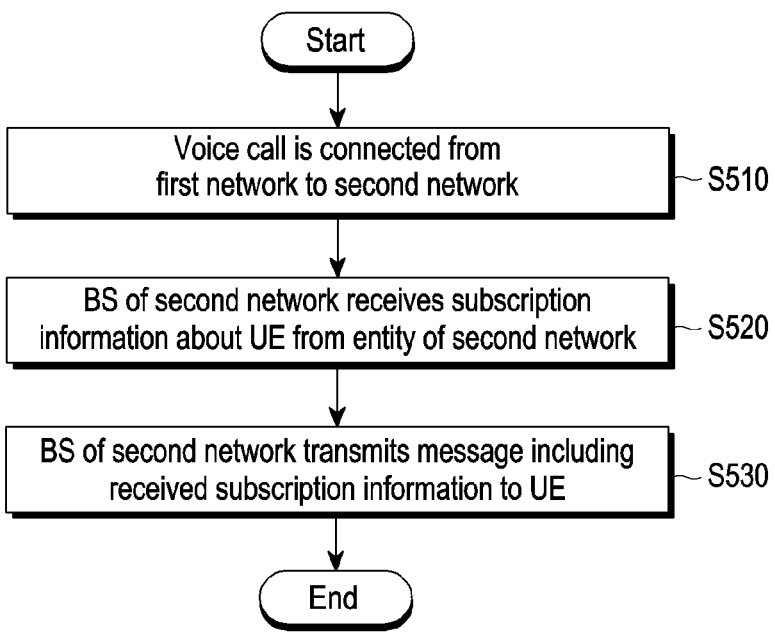
FIG. 5 is a flowchart illustrating a method of communicating with a network by a base station (BS) of a second network in a wireless communication system according to an embodiment of the disclosure.

FIG. 5 is a flowchart illustrating a method of communicating with a network by a BS of a second network in a wireless communication system according to an embodiment of the disclosure.

Referring to FIG. 5, in the method of communicating with a network by the BS 120 of the second network in a wireless communication system, a voice call may be connected from the first network to the second network (S510). The first network and the second network may communicate using different RATs, and the voice call may be connected between a UE and the second network in a CS manner.

The BS 120 of the second network may receive control information for the UE from the network entity (SGSN) 130 of the second network (S520). The control information may include at least one of an SPID or a PLMN ID.

The BS 120 of the second network may transmit a message including the received control information for controlling radio access to the UE 100 (S530). The message may be an RRC release message. The message may be transmitted to the UE 100 after completion of the voice call of the UE 100. The control information may include priority information about RATs and PLMNs. Prior to the voice call connection, the UE 100 communicates with the first network, using a first RAT, and the priority information may prioritize the PLMN of the first network and the first RAT as a first priority.

Upon receipt of the control information, the UE 100 may determine a RAT to be used and a PLMN to be accessed after the completion of the voice call, and communicate with a network of the determined PLMN, using the determined RAT.

Figure 6:
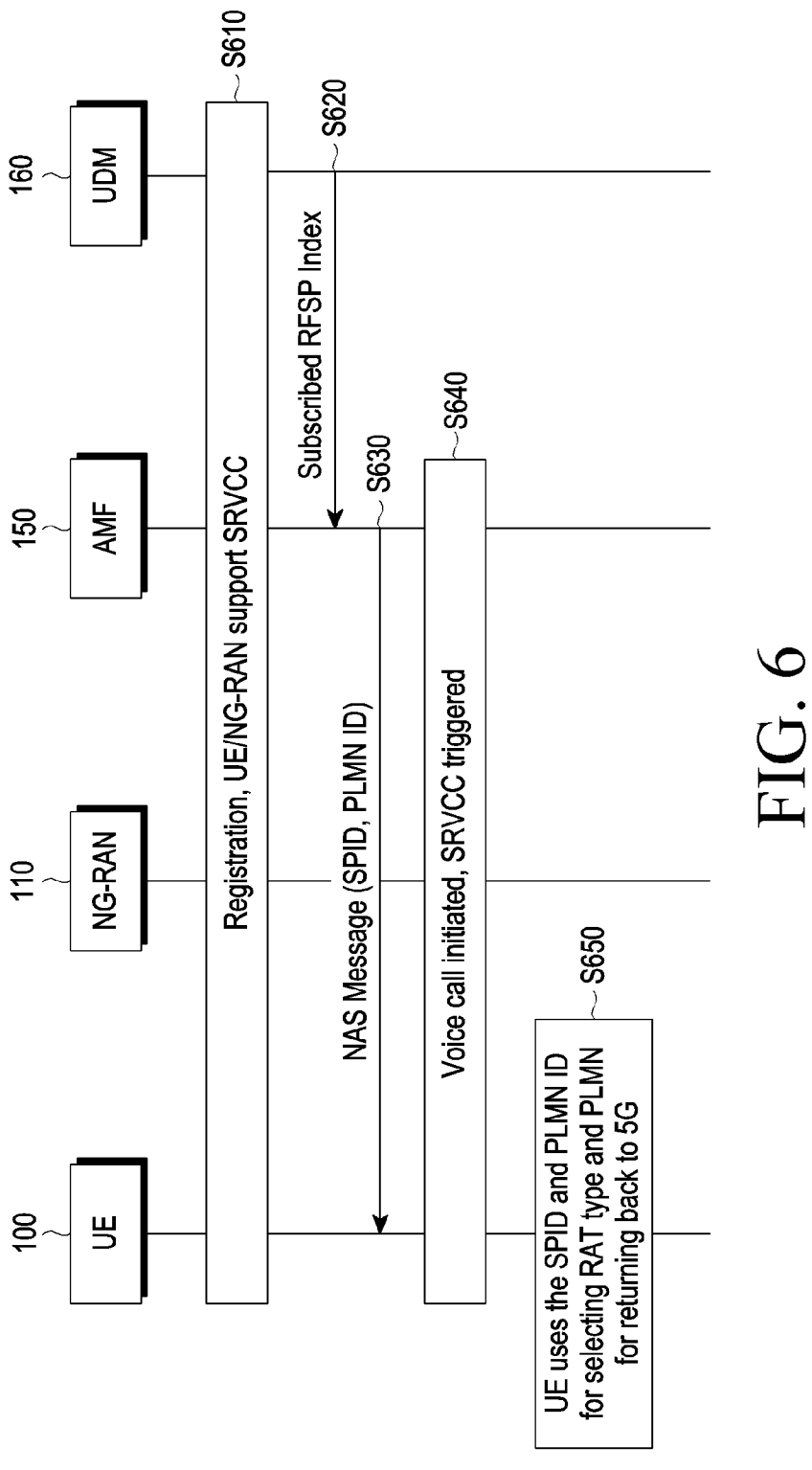
FIG. 6 is a flowchart illustrating a method of transmitting, to a UE, a RAT and a PLMN to be used by the UE after completion of an SRVCC-based voice call of the UE according to another embodiment of the disclosure.

FIG. 6 is a flowchart illustrating a method of transmitting, to a UE, a RAT and a PLMN to be used by the UE after completion of an SRVCC-based voice call of the UE according to another embodiment of the disclosure.

Referring to FIG. 6, the UE 100, which has registered in a 5G network, may exchange information indicating support of 5G-3G SRVCC (hereinafter referred to as SRVCC) with the 5G network in the registration step or an additional information exchange procedure (S610).

An NF (hereinafter, referred to as a UDM) 160 storing control information (subscription data) may transmit information indicating the priorities of radio access frequencies or RATs (5G/4G/3G) to be selected by a UE to an NF (hereinafter, an AMF) 150 for an access and mobility control function for the UE 100 (S620). This information may be RFSP IDs (or indexes). In addition, a PLMN ID to be preferentially selected by the UE upon completion of a voice call after an SRVCC operation may be included. The information may be transmitted in the registration process of step 1 or in a separate procedure.

The AMF 150 may transmit, to the UE 100, a message including information indicating the priorities of radio access frequencies or RATs (5G/4G/3G) to be selected by the UE 100 after completion of the voice call (S630). The information indicating the priorities of radio access frequencies or RATs to be selected by the UE 100 after completion of the voice call may be SPIDs. Further, In addition, the message transmitted from the AMF 150 to the UE 100 may include a PLMN ID that the UE 100 is to preferentially select upon the completion of the voice call after the SRVCC operation. The AMF 150 may determine information to be selected and transmitted, using the information received from the UDM 160 in step S630 and an operator configuration inside the AMF 150. The AMF 150 may instruct the UE 100 to preferentially select a current wireless network (the frequency of 5G as the current RAT) and a current PLMN (a registered PLMN) and return to the current wireless network and PLMN after completion of the voice call by the message.

The message transmitted to the UE 100 by the AMF 150 may be a non-access stratum (NAS) message. The information indicating the priorities of radio access frequencies or RATs (5G/4G/3G) to be selected by the UE 100 after the completion of the voice call and information about the PLMN ID to be preferentially selected by the UE 100 upon the completion of the voice call after the SRVCC operation may be transmitted to the UE 100 by a Registration Accept message during the registration process described above or by a UE Configuration Update message or another NAS message. Upon receipt of the information, the UE 100 may store the corresponding information, and maintain the information even when transitioning to another network (a 3G or 4G network), and the information may be applied to a returning operation after handover of the voice call to 3G. In other words, the UE 100 may select a radio access frequency or RAT to be preferentially selected, and a PLMN ID to be preferentially selected, using the received information after the completion of the voice call.

A voice call is started, and SRVCC to the 3G network occurs according to a condition (S640).

Upon completion of the voice call, the UE 100 may determine a frequency, RAT, and PLMN ID to be preferentially accessed by using the information received in step S630 (S650). When the information is configured such that the access priority of the 5G network is high, the UE 100 operates to preferentially access the 5G network. When the information is configured to preferentially select the radio network and the PLMN ID prior to the occurrence of SRVCC, the UE 100 may preferentially select the 5G network and the PLMN ID used in the 5G network.

With a modification to step S630 of the embodiment, the AMF 150 may transmit information to an NG-RAN 110, and the NR-RAN 110 may transmit, to the UE 100, information for the UE 100 to use when returning, rather than the AMF 150 transmits, to the UE 100, the information for the UE 100 to use when returning. The AMF 150 may include information about the priorities of radio access frequencies or RATs (5G/4G/3G) to be selected by the UE 100 upon completion of the voice call in the message (e.g., UE Context Setup or the like) transmitted to the NG-RAN 110. Further, the message may include a PLMN ID that the UE 100 is to preferentially select upon the completion of the voice call after the SRVCC operation. The AMF 150 may determine information to be selected and transmitted, using the information received from the UDM 160 and an operator configuration of the AMF 150. The NG-RAN 110 may then include the information about the priorities of radio access frequencies or RATs (5G/4G/3G) to be selected by the UE 100 upon completion of the voice call in the message (e.g., RRC release) transmitted to the UE. This information may be in the form of indexes indicating preset priorities of specific frequencies or RATs. This information may be subscriber profile IDs for RFSP indexes (SPIDs). The information may further include a PLMN ID to be preferentially selected by the UE 100 upon completion of the voice call after the SRVCC operation. Alternatively, the information may include information instructing the UE 100 to preferentially select a current wireless network (the frequency of 5G as the current RAT) and a current connected PLMN (a registered PLMN) and return to the current wireless network and PLMN after completion of the voice call.

Figure 7:
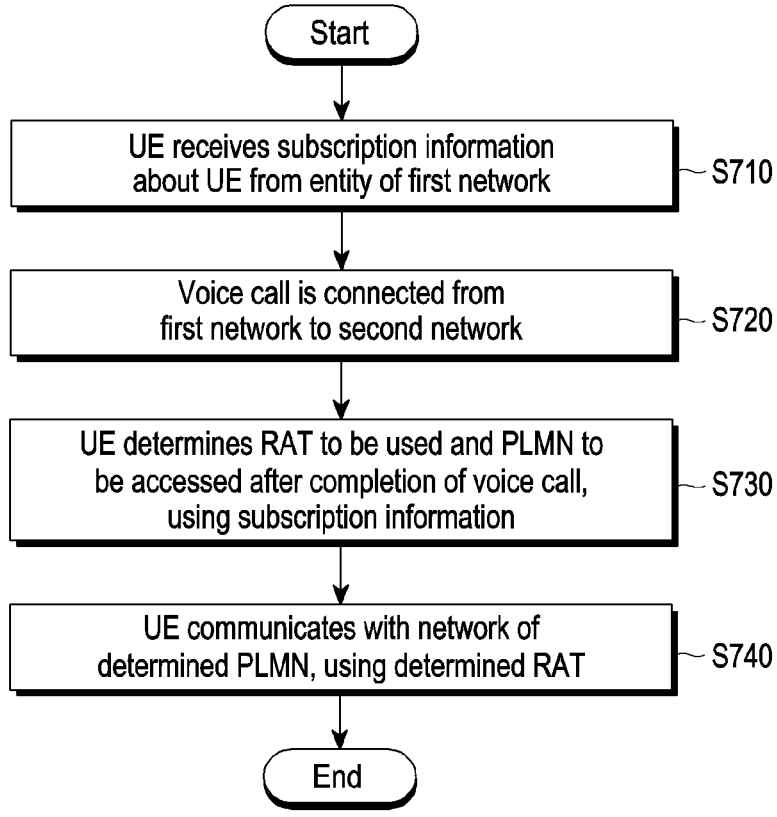
FIG. 7 is a flowchart illustrating a method of communicating with a network by a UE connected to a first network in a wireless communication system according to another embodiment of the disclosure.

FIG. 7 is a flowchart illustrating a method of communicating with a network by a UE connected to a first network in a wireless communication system according to another embodiment of the disclosure.

Referring to FIG. 7, in the method of communicating with the network by the UE 100 connected to the first network in a wireless communication system, the UE 100 may receive control information for the UE 100 from the entity (AMF) 150 of the first network (S710). The control information may be included in a NAS message received from the entity (AMF) 150 of the first network. Alternatively, the control information may be transmitted from the entity (AMF) 150 of the first network to the BS 110 of the first network and then included in a message received from the BS 110 by the UE 100. The control information may be received from the entity (AMF) 150 of the first network periodically or when a specific condition is satisfied.

The UE 100 may connect a voice call to the second network (S720). The first network and the second network may communicate using different RATs, and the voice call may be connected to the second network in a CS manner. The voice call connection may be an SRVCC handover. The first network may be a 5G network, and the second network may be a 3G network.

The UE 100 may determine a RAT to be used and a PLMN to be accessed after completion of the voice call, using the control information (S730). The control information may include priority information about RATs and PLMNs. Prior to the voice call connection, the UE 100 communicates with the first network, using a first RAT, and the priority information may prioritize the PLMN of the first network and the first RAT as a first priority.

The UE 100 may communicate with a network of the determined PLMN, using the determined RAT (S740).

Figure 8:
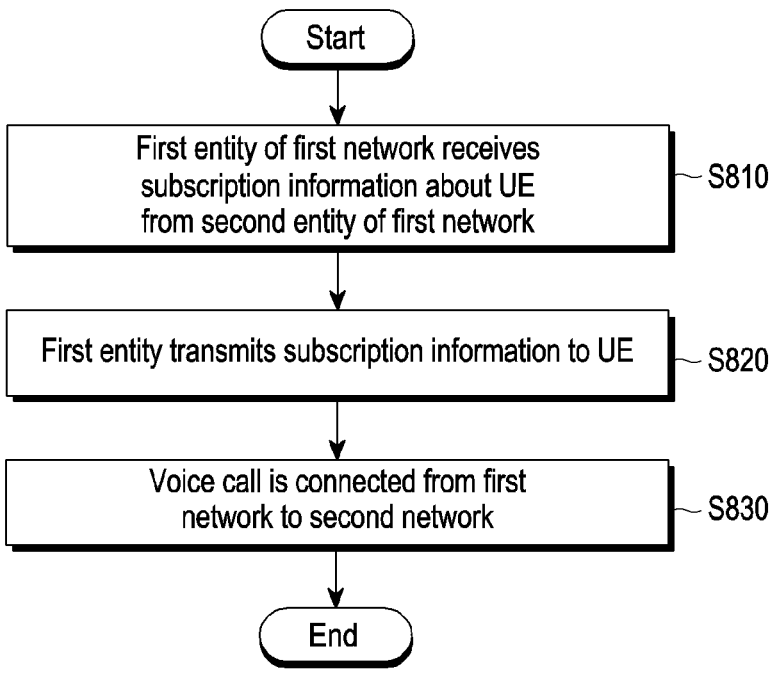
FIG. 8 is a flowchart illustrating a method of communicating with a network by a first entity of a first network in a wireless communication system according to another embodiment of the disclosure.

FIG. 8 is a flowchart illustrating a method of communicating with a network by a first entity of a first network in a wireless communication system according to an embodiment of the disclosure.

Referring to FIG. 8, in the method of communicating with a network by a first entity (ANF) 150 of the first network in a wireless communication system, the first entity (AMF) 150 of the first network may receive control information for a UE from a second entity (UDM) 160 of the first network (S810). The control information may be received in a first message received from the entity of a first RAT, and the first message may be received from the entity of the first RAT periodically or when a specific condition is satisfied.

The first entity (ANF) 150 may transmit the control information (S820). The control information may include priority information about RATs and PLMNs. Prior to a voice call connection, the UE 100 may communicate with the first network, using the first RAT, and the priority information may prioritize the PLMN of the first network and the first RAT as a first priority.

A voice call may be connected from the first network to the second network (S830). The first network and the second network may communicate using different RATs, and the voice call may be connected to the second network in a CS manner. The voice call connection may be SRVCC handover. The first network may be a 5G network, and the second network may be a 3G network.

Figure 9:
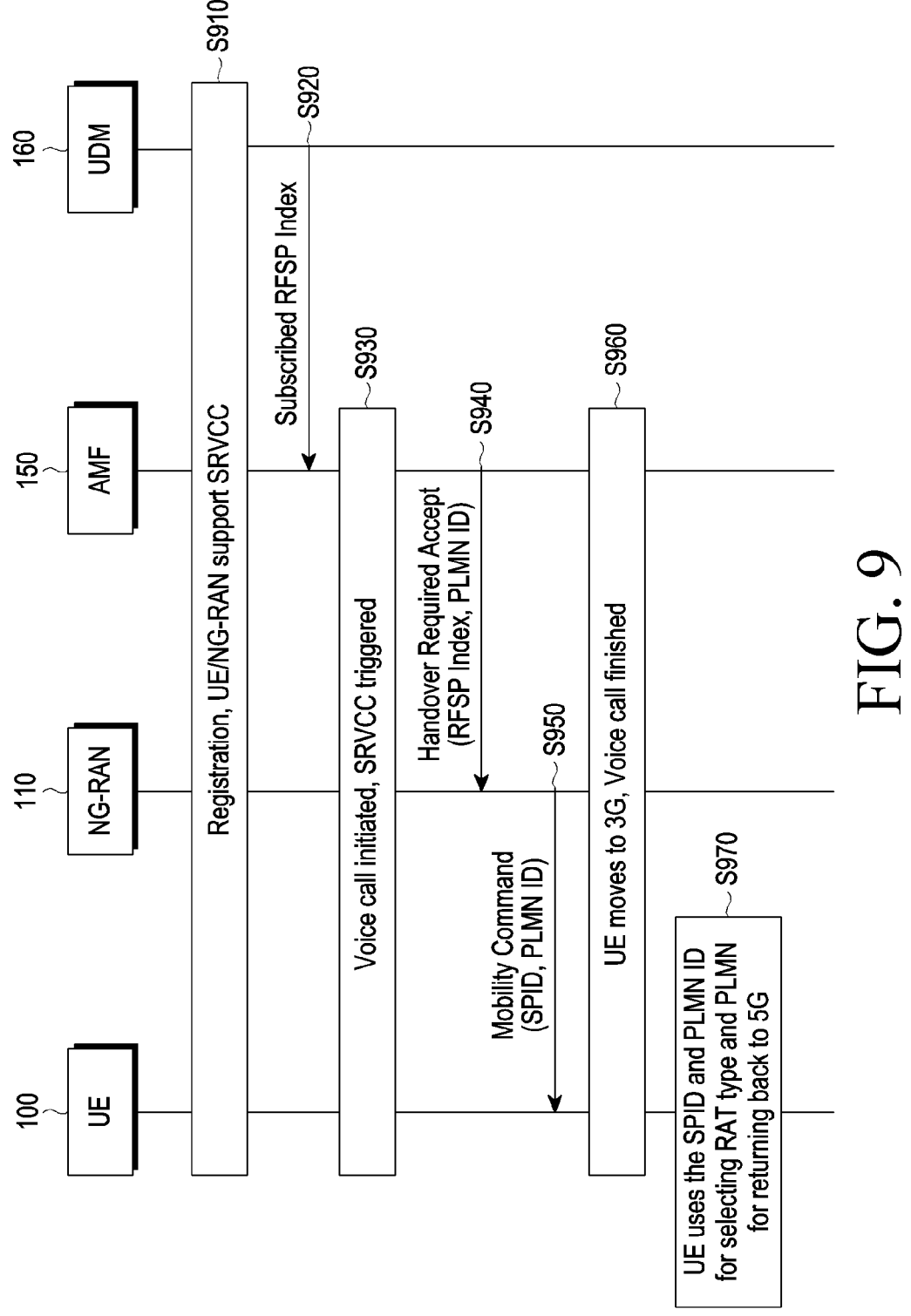
FIG. 9 is a flowchart illustrating a method of transmitting, to a UE, a RAT and a PLMN to be used by the UE after completion of an SRVCC-based voice call of the UE according to another embodiment of the disclosure.

FIG. 9 is a flowchart illustrating a method of transmitting, to a UE, a RAT and a PLMN to be used by the UE after completion of an SRVCC-based voice call of the UE according to another embodiment of the disclosure.

Referring to FIG. 9, the UE 100 has been registered in a 5G network, and the UE 100 and the 5G network may exchange information indicating support of a 5G-3G SRVCC (hereinafter, referred to as SRVCC) function with each other in the registration step or an additional information exchange procedure (S910).

The NF (hereinafter, referred to as a UDM) 160 storing control information (subscription data) may transmit information indicating the priorities of radio access frequencies or RATs (5G/4G/3G) to be selected by the UE 100 to the NF (hereinafter, an AMF) 150 for an access and mobility control function for the UE 100 (S920). This information may be RFSP IDs (or indexes). In addition, a PLMN ID to be preferentially selected by the UE 100 upon completion of a voice call after an SRVCC operation may be included. The information may be transmitted during registration of step S910 or in a separate procedure.

A voice call is started (originated or terminated) for the UE (subscriber), and as SRVCC is triggered for the UE according to the state and location of the UE and a network configuration, an SRVCC is performed (S930). The SRVCC procedure is basically a process of transferring UE information including a voice call from a 5G network to a 3G network, and particularly, performing handover of the voice call from a 5G PS network (based on an IMS) to a CS network.

During the SRVCC procedure, upon receipt of a handover request (i.e., a request to handover the UE 100 from the 5G network to the 3G network) from the NG-RAN (BS) 110, the AMF 150 may process the handover request and transmit a response to the handover request to the NG-RAN 110 (S940). The response message may include information indicating the priorities of radio access frequencies or RATs (5G/4G/3G) to be selected by the UE 100 after completion of the voice call. In addition, the PLMN ID to be preferentially selected by the UE 100 upon completion of the voice call after the SRVCC operation may be included. The response message may be a handover required accept message, a first handover command message, or a first handover message. The AMF 150 may determine which information to select and transmit, using the information received from the UDM 160 in step 3 and an operator configuration of the AMF 150.

The NG-RAN 110 transmits a message for transitioning the UE 100 to the 3G network to the UE 100 during the SRVCC procedure (S950). The message may be a mobility command message, a second handover command message, or a second handover message. The message may include information indicating that a network to be transitioned to is 3G, information about a 3G BS to be selected by the UE 100, and information about a 3G cell or frequency to be selected by the UE 100. In addition, the message transmitted from the NG-RAN to the UE may include information indicating the priorities of radio access frequencies or RATs (5G/4G/3G) to be selected by the UE 100 after completion of the voice call. This information may be in the form of indexes indicating preset priorities of specific frequencies or RATs. This information may be SPIDs. In addition, a PLMN ID to be preferentially selected by the UE 100 upon completion of the voice call after the SRVCC operation may be included. Alternatively, the NG-RAN may transmit information instructing the UE to preferentially select a current wireless network (the frequency of 5G as the current RAT) and a current connected PLMN (a registered PLMN) and return to the current wireless network and PLMN, after completion of the voice call.

The UE 100 performs handover to the 3G network according to the command (S960). Then, the voice call proceeds in the 3G network, and then ends (S960).

Upon completion of the voice call, the UE 100 determines a frequency, RAT, and PLMN ID to be preferentially accessed by using the information received in step S950 (S970). When the information is configured such that the access priority of the 5G network is high, the UE operates to access the 5G network preferentially.

FIG. 10 is a flowchart illustrating a method of communicating with a network by a UE connected to a first network in a wireless communication system according to another embodiment of the disclosure.

Referring to FIG. 10, in the method of communicating with the network by the UE 100 connected to the first network in a wireless communication system, a voice call connection to the second network may be triggered (S1010). The first network and the second network may communicate using different RATs, and the voice call may be connected to the second network in a CS manner. The voice call connection may be an SRVCC handover. The first network may be a 5G network, and the second network may be a 3G network.

The UE 100 may receive control information for the UE 100 from a BS of the first network (S1020). The control information may be received in a handover message.

The UE 100 may determine a RAT to be used and a PLMN to be accessed after completion of the voice call, using the control information (S1030).

The control information may include priority information about RATs and PLMNs. Prior to the voice call connection, the UE 100 communicates with the first network, using a first RAT, and the priority information may prioritize the PLMN of the first network and the first RAT as a first priority.

FIG. 11 is a flowchart illustrating a method of communicating with a network by a BS of a first network in a wireless communication system according to another embodiment of the disclosure.

Referring to FIG. 11, in the method of communicating with the network by the BS 110 of the first network in a wireless communication system, a voice call connection may be triggered from the first network to the second network (S1110). The first network and the second network may communicate using different RATs, and the voice call may be connected to the second network in a CS manner. The voice call connection may be SRVCC handover. The first network may be a 5G network, and the second network may be a 3G network.

The BS 110 of the first network may receive control information for the UE from the entity (AMF) 150 of the first network (S1120). The control information may be received in a first handover message from the BS.

The BS 110 of the first network may transmit the control information to the UE (S1130). The control information may be transmitted in a second handover message to the UE 100. The control information may include priority information about RATs and PLMNs. Prior to the voice call connection, the UE 100 communicates with the first network, using a first RAT, and the priority information may prioritize the PLMN of the first network and the first RAT as a first priority.

Figure 12:
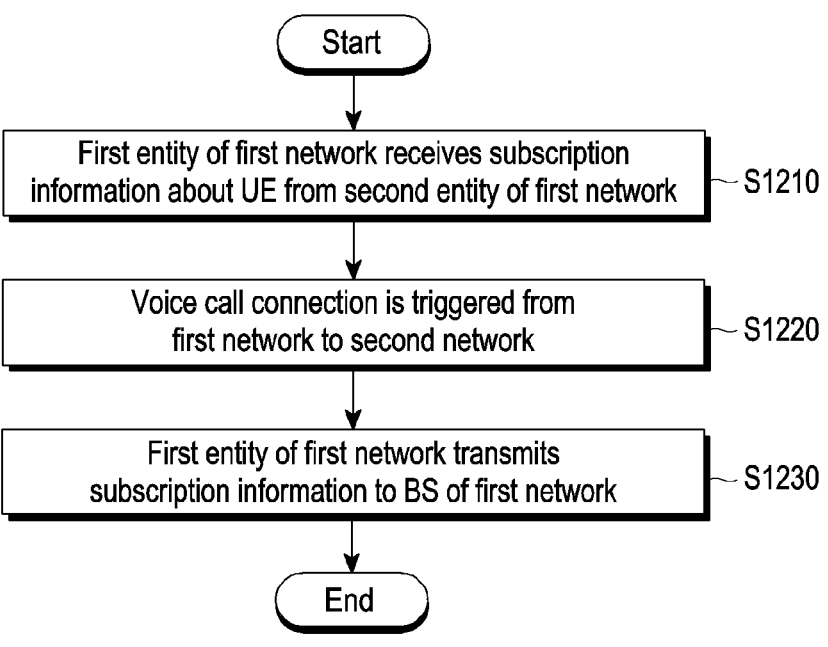
FIG. 12 is a flowchart illustrating a method of communicating with a network by a first entity of a first network in a wireless communication system according to another embodiment of the disclosure.

FIG. 12 is a flowchart illustrating a method of communicating with a network by a first entity of a first network in a wireless communication system according to another embodiment of the disclosure.

Referring to FIG. 12, in the method of communicating with the network by the first entity of the first network in the wireless communication system, the UE 100 may receive control information from the second entity (UDM) 160 of the first network (S1210). The control information may be received in the process of registering the UE 100 in the first network or in a separate procedure.

A voice call connection may be triggered from the first network to the second network (S1220). The first network and the second network may communicate using different RATs, and the voice call may be connected to the second network in a CS manner. The voice call connection may be SRVCC handover. The first network may be a 5G network, and the second network may be a 3G network.

The first entity (AMF) 150 may transmit the control information to the BS of the first network (S1230). The control information may be included in a handover message transmitted to the BS.

Figure 13:
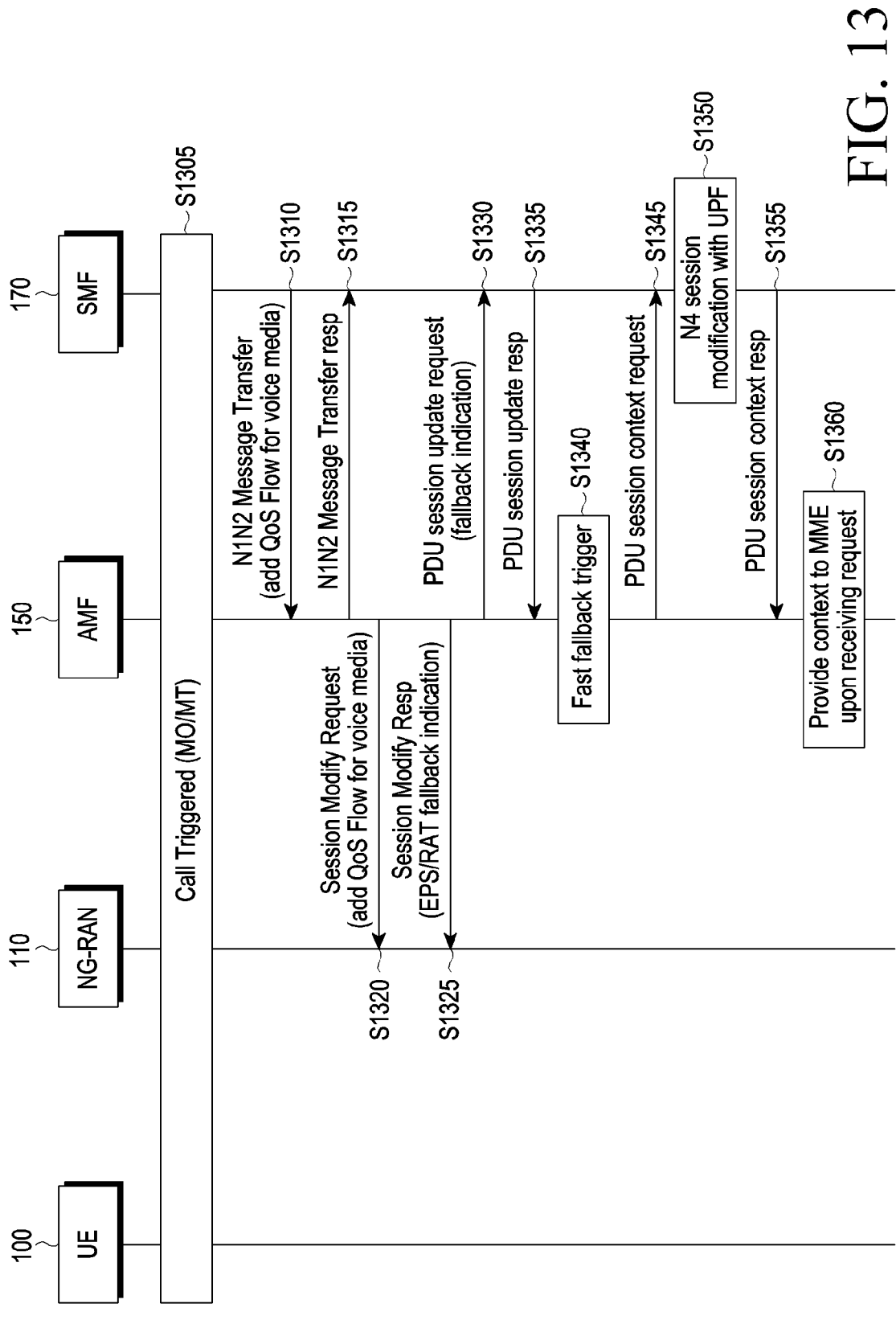
FIG. 13 is a diagram illustrating a method of reducing a voice call setup time of a UE according to another embodiment of the disclosure.

FIG. 13 is a diagram illustrating a method of reducing a voice call setup time of a UE according to another embodiment of the disclosure.

Referring to FIG. 13, the UE 100 has been registered in a 5G network and registered in an IMS network for voice service. A voice call (origination/termination) occurs to the UE 100 (S1305).

During processing of the voice call, an SMF 170 creates a new QoS flow for transmitting and receiving voice media and transmits a request message for adding the QoS flow to a session to the AMF 150 (S1310).

The AMF 150 transmits a response message to the SMF 170. This step may be performed after step S1320 or step S1325. When the transmission is performed after step S1325, the response message transmitted from the AMF 150 to the SMF 170 may include an indication indicating that fallback has occurred. When the transmission is performed after step S1325, steps S1330 and S1335 may be skipped.

The AMF 150 transmits a Session Modify request message for adding the QoS flow for transmitting and receiving voice media to the session to the NG-RAN 110 according to the request received from the SMF 170 (S1320).

The NG-RAN 110 determines whether EPS fallback or inter-RAT fallback is required to provide a voice service. When fallback occurs, the NG-RAN 110 may transmit a Session Modify response message to the AMF 170, and the message may include an indicator indicating that fallback should occur (S1325).

The AMF 150 transmits a message indicating fall occurrence to the SMF 170 (S1330).

The SMF 170 transmits a response message to the AMF 150 (S1335).

The AMF 150 may determine whether to apply a function of reducing a fallback time. The AMF 150 may determine that this function is applicable, when a configuration of the AMF 150 and a supported feature received from the SMF 170 indicates that the SMF 170 also supports the fallback time reduction function after the AMF 150 recognizes that fallback has been triggered for the UE 100.

When the fallback time reduction function is applied, the AMF 150 may transmit a request to the SMF 170 even before reception of a context request for the UE from an MME, to receive an SM context (interchangeably used with a PDU session context in the same meaning) for the UE in advance (S1345). When the AMF 150 applies the fallback time reduction function, transmits the request for SM context transmission for the UE to the SMF 170, and then receives the context request for the UE from the MME, the AMF 150 should not transmit the SM context request again to the SMF 170. When two or more PDU sessions are configured for the UE, the AMF 150 may request SM context transmission for each PDU session.

When the SMF 170 needs to perform N4 session modification with a UPF before responding to a PDU session that the AMF 150 requests to receive, the SMF 10 exchanges N4 messages with the UPF (S1350).

The SMF 170 may transmit information about the PDU session to the AMF 150 according to a request of the AMF 150 (S1355).

The AMF 150 may store the SM context received from the SMF 170, and upon reception of a context transmission request for the UE from the MME, transmit a context response to the MME, using the corresponding information without additional information exchange with the SMF 170 (S1360).

Figure 14:
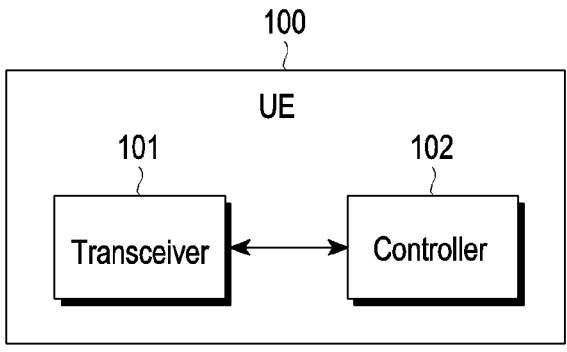
FIG. 14 is a block diagram illustrating the configuration of a UE according to an embodiment of the disclosure.

FIG. 14 is a block diagram illustrating the configuration of a UE according to an embodiment of the disclosure.

Referring to FIG. 14, the UE 100 connected to a first network and communicating with a network in a wireless communication system may include a transceiver 101 and a controller 102. The transceiver 101 may receive a message including control information for controlling radio access of the UE from a BS of a second network, and receive a message including control information for controlling radio access of the UE from a BS of the first network. The controller 102 may connect a voice call to the second network, and determine a RAT to be used and a PLMN to be accessed after completion of the voice call, using the control information.

Figure 15:
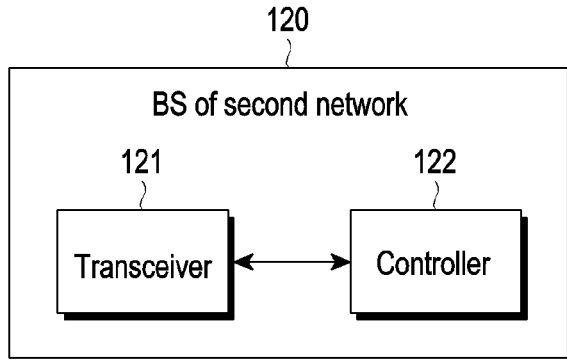
FIG. 15 is a block diagram illustrating the configuration of a BS of a second network according to an embodiment of the disclosure.

FIG. 15 is a block diagram illustrating the configuration of a BS of a network according to an embodiment of the disclosure.

Referring to FIG. 15, the BS 120 of a network, which communicates with another network or another entity in a wireless communication system may include a transceiver 121 and a controller 122. The transceiver 121 may receive control information for a UE from another network entity. The controller 122 may control the transceiver to transmit a message including the received control information for controlling radio access to the UE.

Figure 16:
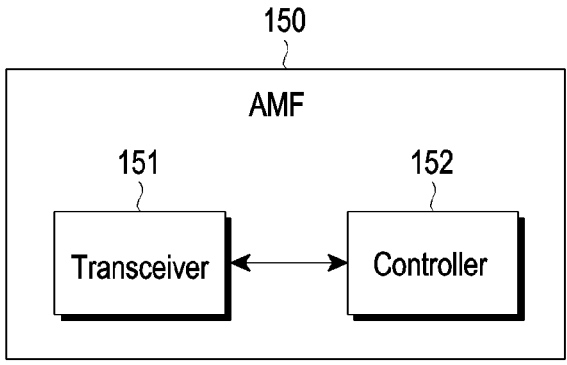
FIG. 16 is a block diagram illustrating the configuration of an entity (an access and mobility management function (AMF)) in a first network according to an embodiment of the disclosure.

FIG. 16 is a block diagram illustrating the configuration of a network entity according to an embodiment of the disclosure.

Referring to FIG. 16, the network entity may include, for example, an AMF. The network entity 150 may include a transceiver 151 and a controller 152 to communicate with another network or another entity in a wireless communication system. The transceiver 151 may receive, for example, control information for a UE from the second entity (UDM) 160. The controller 152 may control the transceiver 151 to transmit the control information to the UE 100, and connect a voice call from the first network to a second network.

Figure 17:
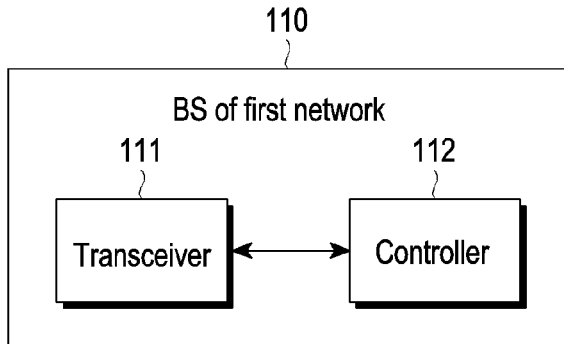
FIG. 17 is a block diagram illustrating the configuration of a BS in a first network according to an embodiment of the disclosure.

FIG. 17 is a block diagram illustrating the configuration of a BS of a network according to an embodiment of the disclosure.

Referring to FIG. 17, the BS 110 of a first network, which communicates with another network or another entity in a wireless communication system may include a transceiver 111 and a controller 112. The transceiver 111 may receive control information for a UE from the entity (AMF) 150. The controller 112 may transmit the control information to the UE 100.

Control information described in this specification may be replaced by subscription information.

It should be noted that the configuration diagrams illustrated in FIGS. 1 to 17, exemplary diagrams illustrating control/data signal transmission methods, exemplary diagrams illustrating operation procedures, and configuration diagrams are not intended to limit the scope of the disclosure. That is, all components, entities, or operation steps described with reference to FIGS. 1 to 17 should not be construed as essential components for implementation of the disclosure, and the disclosure may be implemented even with only some components, within the subject matter of the disclosure.

The afore-described operations of a BS or a UE may be implemented by providing a memory device storing a corresponding program code in any component in the BS or the UE. That is, the controller of the BS or the UE may perform the above-described operations by reading and executing the program code stored in the memory device by a processor or a central processing unit (CPU).

Various components and modules of an entity, a BS, or a UE described in this specification may operate using a hardware circuit such as a complementary metal oxide semiconductor-based logic circuit, firmware, software and/ or a combination of hardware and firmware and/or software embedded in a machine-readable medium. For example, various electrical structures and methods may be implemented using electrical circuits such as transistors, logic gates, and application-specific semiconductors.

While specific embodiments have been described in the detailed description of the disclosure, various modifications can be made without departing from the scope of the disclosure. Therefore, the scope of the disclosure should be defined by the claims described below as well as the claims and their equivalents, not limited to the described embodiments.

The invention claimed is:

1. A method performed by a user equipment (UE) in a wireless communication system, the method comprising:

exchanging information indicating support of a single radio voice call continuity (SRVCC) handover with a fifth generation (5G) network in a registration procedure;

connecting a voice call to the 5G network when the UE has been registered in the 5G network, wherein SRVCC is triggered for the UE based on a state and a location of the UE and a network configuration;

receiving, from an access and mobility management function (AMF) in the 5G network, an SRVCC handover command comprising a non-access stratum (NAS) message including control information for a radio access operation of the UE in a 5G network;

when the UE receives the SRVCC handover command, connecting the voice call to a 3G network using the SRVCC handover from the 5G network to the 3G network; and determining, based on the control information, a radio access technology (RAT) for the radio access operation and a public land mobile network (PLMN) to be accessed using the RAT after completing the voice call, wherein the voice call is connected to the 3G network in a circuit switched (CS) manner, the voice call being transitioned from a packet switched (PS) manner.

2. The method of claim 1, wherein the control information includes at least one of a subscriber profile identifier (SPID) or a PLMN ID, and wherein the message comprises a radio resource control (RRC) release message.

3. The method of claim 1, wherein the control information includes priority information for RATs and PLMNs.

4. The method of claim 3, wherein the UE communicates with the 5G network using a first RAT before connecting the voice call, and wherein the priority information indicates that a priority of a PLMN of the 5G network is higher than a priority of a PLMN of the 3G network and a priority of the first RAT is higher than a priority of a second RAT.

5. A user equipment (UE) in a wireless communication system, the UE comprising: a transceiver; and a controller communicatively coupled to the transceiver; and memory, communicatively coupled to the controller, storing instructions executable by the controller to cause the UE to:

exchange information indicating support of a single radio voice call continuity (SRVCC) handover with a fifth-generation (5G) network in a registration procedure, connect a voice call to the 5G network when the UE has been registered in the 5G network, wherein SRVCC is triggered for the UE based on a state and a location of the UE and a network configuration, receive, from an access and mobility management function (AMF) in the 5G network, an SRVCC handover command comprising a non-access stratum (NAS) message including control information for a radio access operation of the UE in the 5G network, when the UE receives the SRVCC handover command, connect the voice call to a 3G network using the SRVCC handover from the 5G network to the 3G network, and determine, based on the control information, a radio access technology (RAT) for the radio access operation and a public land mobile network (PLMN) to be accessed using the RAT after completing the voice call, wherein the voice call is connected to the 3G network in a circuit switched (CS) manner, the voice call being transitioned from a packet switched (PS) manner.

6. The UE of claim 5, wherein the control information includes at least one of a subscriber profile identifier (SPID) or a PLMN ID, and wherein the message comprises a radio resource control (RRC) release message.

7. The UE of claim 5, wherein the control information includes priority information for RATs and PLMNs.

8. The UE of claim 7, wherein the UE communicates with the 5G network using a first RAT before connecting the voice call, and wherein the priority information indicates that a priority of a PLMN of the 5G network is higher than a priority of a PLMN of the 3G network and a priority of the first RAT is higher than a priority of a second RAT.

* * * * *